Aug. 13, 1963  T. L. CROWE  3,100,537
FORMATION TESTING APPARATUS
Filed Sept. 1, 1960  2 Sheets-Sheet 1

INVENTOR.
TALMADGE L. CROWE
BY
Mellin and Hanscom
ATTORNEYS.

Aug. 13, 1963
T. L. CROWE
3,100,537
FORMATION TESTING APPARATUS
Filed Sept. 1, 1960
2 Sheets-Sheet 2
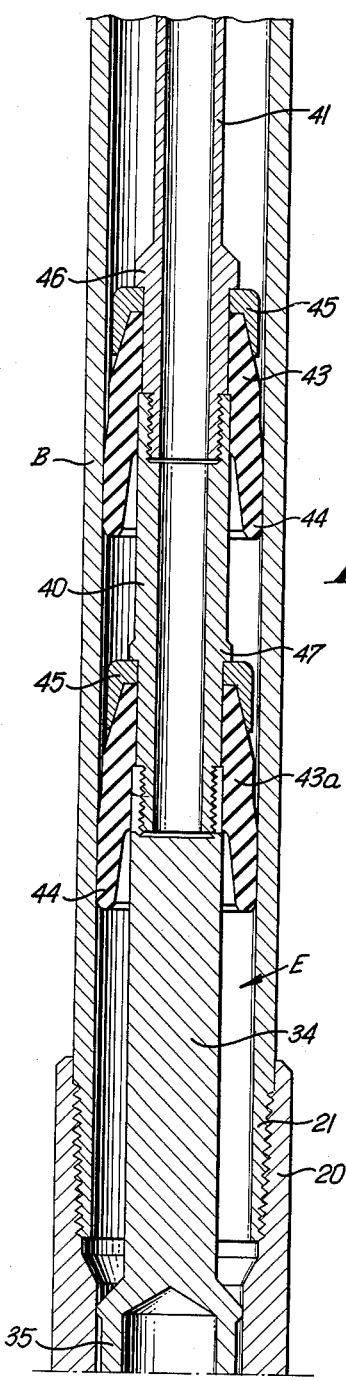
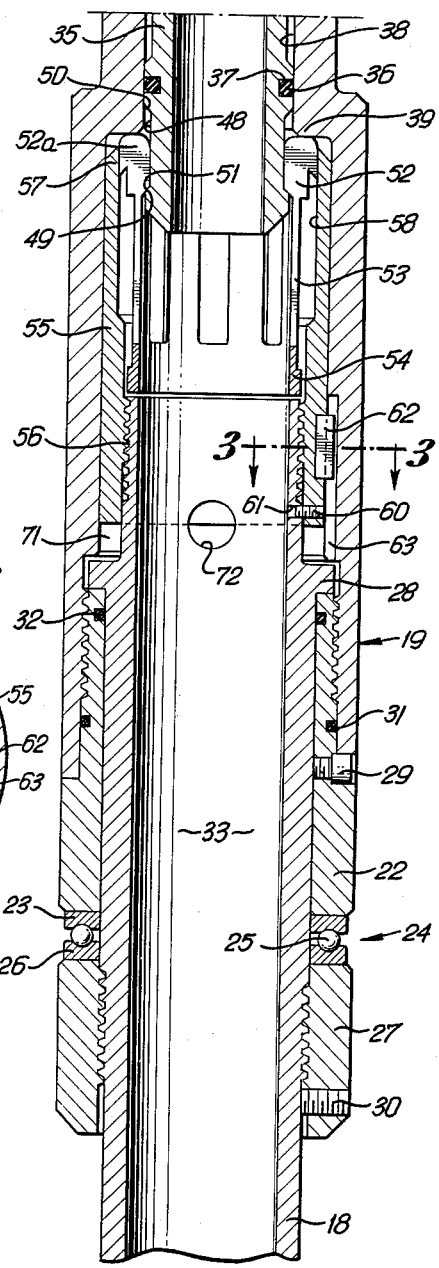
INVENTOR.
TALMADGE L. CROWE
BY
Mellin and Hanscom
ATTORNEYS.

3,100,537
FORMATION TESTING APPARATUS
Talmadge L. Crowe, Zulia, Venezuela, assignor to Baker Oil Tools, Inc., Los Angeles, Calif., a corporation of California
Filed Sept. 1, 1960, Ser. No. 53,470
13 Claims. (Cl. 166—226)

The present invention relates to subsurface well bore apparatus, and more particularly to formation testing apparatus.

An object of the persent invention is to provide improved apparatus for testing a formation under atmospheric or water cushioned conditions, the apparatus then being conditioned for performing another operation in the well bore, such as perforating, fracturing, acidizing or cement squeezing, without removing the major portion of the apparatus from the well bore.

Another object of the invention is to provide improved apparatus for testing a formation which can then be conditioned for performing another operation in the well bore while the apparatus remains therein, the passage through the apparatus being a fully opened and straight-through one to facilitate the movement therethrough of fluent substances, perforators, and the like.

A further object of the invention is to provide apparatus for testing a formation which is normally closed to prevent upward flow of fluid through the apparatus, the apparatus being easily shifted to a condition permitting fluid flow therethrough when a formation test is being performed.

Yet another object of the invention is to provide apparatus for testing a formation which is initially closed by a barrier to prevent upward flow of fluid through the apparatus, the apparatus being readily manipulated to permit upward flow of fluid, and the barrier being easily removed from the apparatus while the latter remains in the well bore to provide an open passageway through the apparatus which will permit it to perform other operations through the apparatus and its open passageway.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURES 1 and 1a together constitute a section through a well casing, with an apparatus set therein against downward movement, portions of the apparatus being disclosed in longitudinal section and portions in side elevation, FIG. 1a constituting a lower continuation of FIG. 1;

FIGS. 2 and 2a together constitute a longitudinal section through the flow control portion of the apparatus shown in FIG. 1, FIG. 2a constituting a lower continuation of FIG. 2;

FIG. 3 is a section taken along the line 3—3 on FIG. 2a;

Figure 1:
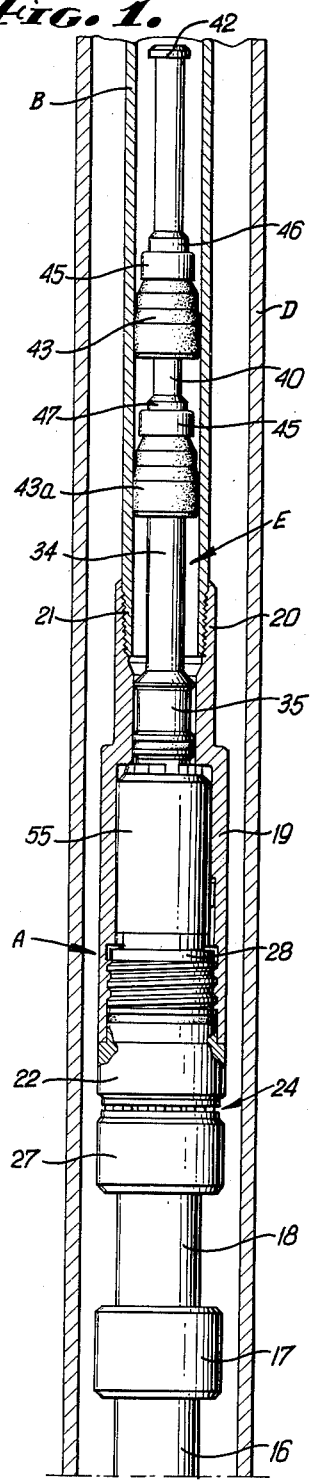

The apparatus illustrated in the drawings is specifically provided to conduct a formation test in a well bore, with a tubing string B on which the apparatus is lowered in the well bore initially in a dry condition, or with a suitable water cushion therewithin. The apparatus includes a well packer C of any suitable type which is adapted to be anchored in packed-off condition in a well casing D against downward movement therewithin, as well as against upward movement therewithin, this well packer being connected to a flow control apparatus A thereabove which will initially prevent flow of fluid through the apparatus, but which can be conditioned to permit such flow of fluid through the apparatus. The flow control apparatus can be appropriately manipulated to allow a barrier or similar device E therewithin to be released and removed through the tubular string B to the top of the well bore, so that a straight-through passage then exists through the apparatus. A suitable operation can then be performed, such as a squeeze cementing operation, through the tubing string B and the open passageway in the apparatus A, all without removing the apparatus from the well casing.

As stated above, the well packer apparatus C can be of any appropriate form, the one specifically illustrated being shown and described in the United States patent to M. B. Conrad, 2,802,534, patented August 13, 1957 for "Retrievable Double Holding Subsurface Well Tool," and particularly the embodiment shown in FIGS. 11, 12 and 13 thereof. Specific details of this well packer are unnecessary to an understanding of the present invention and for that reason will not be given herein, since such details are found in the above-identified United States patent. It is sufficient to state that the well packer includes a tubular body 10 carrying a suitable packing structure 11 thereon, which is initially in a retracted position, and which can be expanded outwardly into sealing engagement with the wall of the well casing D. The tool also includes an upper expander 12 adapted to be shifted behind a set of upper slips 13 to urge the latter against the wall of the well casing, so that the well packer is anchored against downward movement in the casing. The tool also includes a lower expander 14 on its body 10 adapted to cooperate with a set of lower slips 15. When moved behind the lower slips 15, the expander 14 will shift them laterally outwardly into anchoring engagement with the wall of the well casing and prevent upward movement of the well packer therewithin. When the lower expander 14 shifts upwardly behind the lower slips 10, to anchor them against the well casing, the packing structure 11 will still remain in packed-off condition against the wall of the well casing, as explained in the above-identified patent.

The upper portion of the body 10 of the well packer is connected through a section of tubing 16 to the flow control portion A of the apparatus. If desired, a suitable equalizing valve (not shown), such as normally used in conducting formation tests, may be interposed between the well packer C and the flow control apparatus A. As is known, such equalizing valve has the purpose of equalizing the pressure across the packing structure 11 of the well packer when the latter is to be released, in order to facilitate retraction of the packer parts and permit the apparatus to be removed from the well casing.

The intervening tubing 16 is connected to a suitable coupling 17 which is, in turn, secured to the lower portion of an inner tubular member 18 extending upwardly within an outer tubular housing 19. The tubular housing has an upper threaded box 20 thereon for threaded attachment to the lower pin end 21 of the tubular string B that extends upwardly through the casing D to the top of the well bore. The lower portion of the tubular housing 19 is threadedly attached to a lower housing head 22 surrounding the inner tubular member. The lower end of this head is adapted to rest upon the upper race 23 of a bearing structure 24, the upper race riding upon a series of balls 25 that, in turn, bear against a lower race 26 resting upon a bearing support 27 threadedly attached to the inner tubular member 18. Thus, with downweight imposed on the housing 19, such downweight is transferred through the rollable type bearing 24 to the bearing support 27 and the inner tubular member 18, without undue friction being produced that can prevent rotation of the outer housing 19 relative to the inner tubular member 18. The bearing structure 24 will prevent downward movement of the housing 19 relative to the inner tubular member 18, whereas an upper outwardly directed flange 28, integral with the inner tubular member 18, extending across the upper end of the housing head 22, will prevent relative upward movement of the housing 19 along the inner tubular member 18.

Inadvertent unscrewing of the housing 19 from its head 22 is prevented by a suitable cap screw 29. Inadvertent unthreading of the bearing support 27 on the inner tubular member 18 is prevented by a set screw 30. Moreover, a suitable thread seal 31 can be disposed on the head 22 which is adapted to sealingly engage against the inner wall of the outer housing or tubular member 19, leakage of fluid between the head 22 and inner tubular member 18 being prevented by an inner seal ring 32 on the head engaging the periphery of the inner tubular member 18.

The passage 33 through the flow control apparatus A is closed initially by the barrier device E, which is releasably latched to the housing 19. This barrier device, when released, can be moved by the formation fluid upwardly through the tubular string B, or can be pumped upwardly through the tubular string by reverse circulation to the top of the well bore for removal therefrom. As shown, the barrier device E includes an elongate plug body 34, made of several sections. The lower section 35 extends into the upper portion of the housing 19 and has a suitable side seal ring 36, such as a rubber or rubber-like O ring, disposed in a peripheral groove 37 in the body sealingly engaging an inner wall 38 of the housing above a downwardly facing stop or holding shoulder 39 on the housing. The lower plug body 35 is blank; that is to say, there is no passage therethrough, the upper portion of this lower plug body being secured to an intermediate body section 40, which is, in turn, threadedly attached to an upper body section 41 that may have a head 42 thereon engageable by a suitable overshot (not shown) which may be lowered on a wire line (not shown) in the event that the barrier device is to be removed through the tubular string by means of a wire line.

The body 34 of the barrier device E carries one or a plurality of sealing members adapted to slide and seal along the inner wall of the tubular string B. As shown, the sealing or packing devices are downwardly facing swab cups 43, 43a having lower lip portions 44 adapted to sealingly engage the wall of the tubular string. The upper swab cup 43 seats within a thimble 45 engaging an upper body shoulder 46, the swab cup and thimble being clamped on the body 34 between the shoulder 46 and the upper end of the intermediate section 40. Similarly, the lower packing or sealing device 43a is secured on the body 34, being mounted within a lower thimble 45 engaging a body shoulder 47, the upper end of the lower body section 35 engaging the swab cup 43a and clamping the swab cup and thimble against the shoulder 47. Fluid under pressure can act on the lower swab cup 43a, and possibly on the upper swab cup 43, in the event that leakage occurs around the lower one, to force the entire plug assembly or barrier E upwardly through the tubing string B, after the barrier has been unlatched from the housing 19.

The barrier device E is initially prevented from moving upwardly out of the housing 19 by a releasable coupling or latch mechanism. As shown, the lower plug body 35 has a circumferential groove 48 therein providing a lower upwardly facing shoulder 49 and an upper downwardly facing shoulder 50, the lower shoulder 49 tapering in a downward and outward direction and the upper shoulder in an upward and outward direction. The lower shoulder 49 is adapted to engage a companion shoulder 51 on the lower portion of circumferentially spaced latch fingers 52 formed at the upper ends of the arm portions 53 of a latch sleeve 54 disposed within the housing 19, the lower portion of the latch sleeve having an inside diameter which is preferably no less than the inside diameter of the inner tubular member 18, the housing wall 38 thereabove, and the inside diameter of the tubular string B itself, so that no restrictions or barriers are present in the apparatus A after the plug device E has been removed therefrom.

The latch fingers 52 are retained initially in the plug groove 48 by a retaining sleeve 55 disposed within the housing 19 and threadedly attached, by means of a right-hand threaded connection 56, with the upper portion of the inner tubular member 18, the lower end of the retaining sleeve being initially disposed a substantial distance above the flange 28 of the inner tubular member. The upper end 57 of the retaining sleeve terminates below the shoulder 39, its inner wall 58 forming a holding surface which engages the outer side of the latch fingers 52 to hold the latch fingers in the plug groove 48. It is to be noted that when the latch fingers are thus held in the plug groove, any tendency for the plug or barrier E to move upwardly will cause the cam shoulder 49 defining the lower end of the groove 48 to engage the latch fingers. The latch fingers 52 cannot move outwardly since they are prevented from doing so by engaging the inner wall 58 of the retainer sleeve 55. The most movement that can occur is an upward shifting of the latch means 52—54 to a slight extent until the upper ends of the latch fingers 52 engage the downwardly facing stop shoulder 39 in the housing 19. It is only after the retaining sleeve 55 has been shifted downwardly out of engagement with the latch fingers 52 that the latter can be expanded outwardly from engagement with the cam or holding shoulder 49 of the plug, the plug then moving upwardly through the fingers 52 and being capable of continuing its upward movement through the tubular string B to the top of the well bore.

Initially, assurance is had that the retaining sleeve 55 will not inadvertently rotate or thread with respect to the inner tubular member 18, so that the latch fingers are maintained in latching condition with the plug body 34. To prevent such inadvertent relative turning between the retaining sleeve and inner tubular member, a shear screw 60 is provided which is threaded in the lower portion of the retaining sleeve 55 and disposed within a hole 61 in the inner tubular member 18. When the shear screw is disrupted, rotation of the retaining sleeve 55 on the inner tubular member 18 can occur. Such rotation is effected by turning the outer tubular housing 19 with respect to the inner tubular member 18. The turning effort of the housing is transmitted to the retaining sleeve 55 by a slidable key and keyway connection. As shown, a key 62 is suitably secured to the retaining sleeve 55 and projects outwardly into an internal longitudinally extending keyway 63 in the housing.

Figure 4:
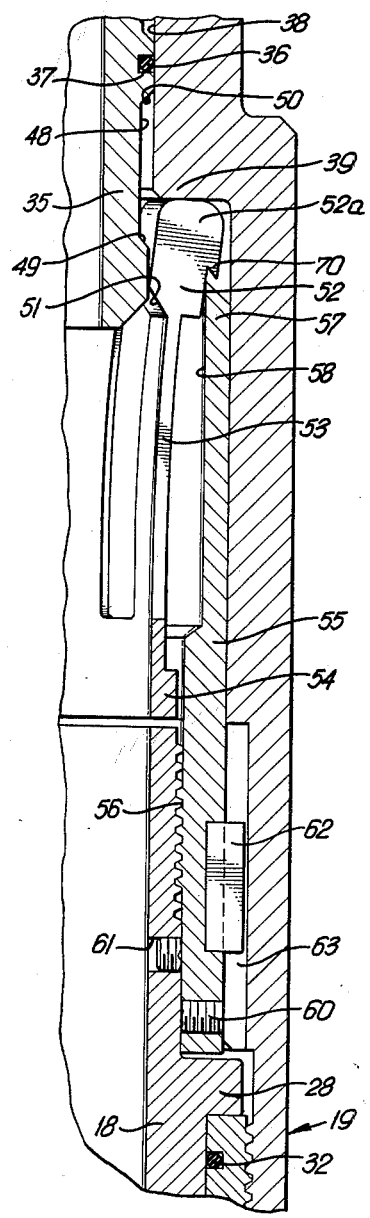
FIG. 4 is a fragmentary longitudinal section, on an enlarged scale, through a portion of the apparatus shown in FIG. 2a, with the barrier device in released condition.

Rotation of the housing 19 and exertion of sufficient torque thereon will first rotate the retaining sleeve 55 and disrupt the shear screw 60. Since the threaded connection 56 between the sleeve 55 and the inner tubular member 18 is preferably a right-hand one, right hand rotation of the housing and retaining sleeve, which occurs as a result of rotating the entire tubular string B, will cause the retaining sleeve 55 to rotate on the inner tubular member 18 and thread downwardly along the tubular member 18 until its upper end 57 is disposed below the upper enlarged portions 52a of the latch fingers. The latch fingers can then be cammed outwardly by the cam surface 49 of the plug to the extent illustrated in FIG. 4, the lower portion of the plug E then being capable of moving upwardly through the latch fingers 52, for continued upward movement through the tubular string B to the top of the well bore. It is to be noted that the latch fingers 52 have downwardly facing hook portions 70 which are adapted to move downwardly and over the acute angle or beveled upper end 57 of the retaining sleeve 55, which will tend to hold the fingers 52 in their outward and released positions, and preclude their inadvertent reshifting back into the passage 33 through the apparatus. It is to be noted that when the latch fingers 52 are in their latching condition (FIG. 2a), the plug E cannot move to any substantial extent downwardly of the housing 19, since the upper shoulder 50 defining the upper side of the latch receiving groove 48 will then engage the upper ends of the latch fingers.

Since the space 71 between the inner tubular member 18 and housing 19, in which the retaining sleeve 55 is disposed, may be filled with liquid, a suitable bleeder port 72 is provided through the inner tubular member 18, opening into such space below the lower end of the retaining sleeve 55 when it is in its latch retaining position, such as disclosed in FIG. 2a. Accordingly, during the downward threading of the retaining sleeve 55 along the inner tubular member 18, the retaining sleeve 55 will displace fluid resulting from the reduction in the volume of the space therebelow through the side port 72 to the interior of the inner tubular member 18. No fluid lock can occur that might preclude downward shifting of the retaining sleeve 55 along the inner tubular member 18 to its latch releasing position.

In performing an operation in a well bore with the apparatus, the flow control device A is secured to the upper portion of the well packer C, either directly or through an equalizing valve (not shown), the upper and lower slips 13, 15 of the well packer, as well as its packing structure 11, being in retracted position. The barrier or plug E is disposed in the flow control portion of the apparatus, being latched in the position disclosed in FIGS. 2 and 2a, in which the retaining sleeve 55 is in its upper position along the inner tubular member 18 and within the housing 19. It is evident that when in this position, the barrier E cannot move upwardly in the housing 19 and in the tubular string B.

Figure 1A:
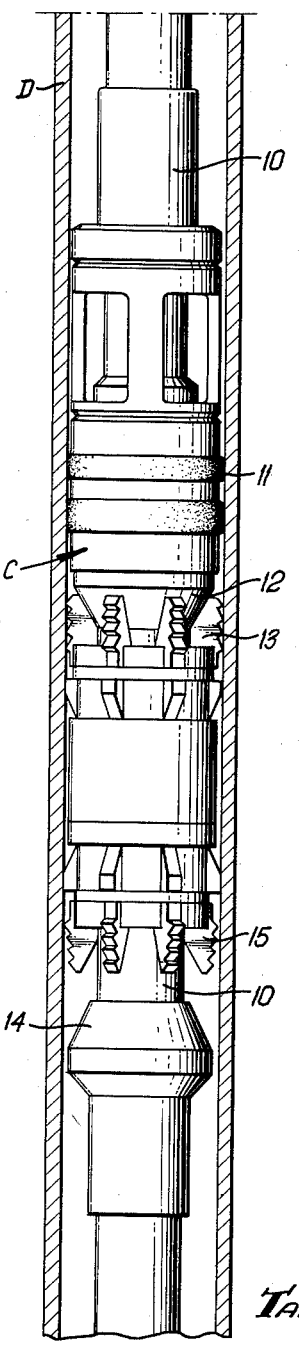

The apparatus is lowered through the well casing D to the desired setting point and the well packer C appropriately manipulated, as described in the above-identified United States patent, to anchor the packer in packed-off condition against downward movement in the well casing, such as disclosed in FIGS. 1 and 1a. The necessary turning effort for releasing the packer for its setting can be transmitted from the tubular string B, through the housing 19 and the retaining sleeve 55 to the inner tubular member 18, which is connected to the well packer C, the shear screw 60 preventing relative movement between the parts at that time. The well packer can be maintained in packed-off condition, if desired, by the imposition of downweight on the tubular string B and the housing 19, this downweight being transferred through the bearing 24 to the bearing support 27 secured to the inner tubular member 18.

The barrier plug E prevents any fluid in the well bore from entering the tubular string B, since it is latched in position and its upward movement cannot take place. For that matter, neither can its downward movement occur. When the formation test is to be performed after the anchoring of the packer C in packed-off condition in the well casing, the set well packer will resist or prevent turning of the inner tubular member 18, whereupon the exertion of sufficient turning effort on the tubular string B and the housing 19 will be transmitted through the key 62 to the retaining sleeve 55, the screw 60 being sheared and the sleeve 55 then rotating with the housing. The sleeve 55 will thread downwardly along the inner tubular member 18 to the position illustrated in FIG. 4, in which the upper end 57 of the retaining sleeve is disposed below the finger hooks 70, allowing the barrier E, which is being urged upwardly by the fluid pressure therebelow, to shift the fingers 52 outwardly from its path. The fluid pressure resulting from the formation test will then shift the plug E upwardly through the tubular string B, the fluid flowing through the well packer C and through the flow control portion A of the apparatus and into the tubing string B thereabove.

If sufficient fluid flows into the tubular string B, it will force the barrier or plug assembly E upwardly to the top of the well bore. If the plug has not been flowed upwardly to the top of the well bore, it can be retrieved on a wire line through use of a suitable overshot (not shown), the overshot grasping the head 42 of the upper section of the plug body 34, whereupon the plug E can be pulled upwardly through the tubular B. Another manner of removing or retrieving the plug assembly or barrier E from the tubing string B is to pump fluid downwardly through the annulus between the tubular string B and the well casing D, this fluid then flowing upwardly into the equalizing valve (not shown) which is in open position, or if the well packer has been shifted to its retracted position, the fluid can flow downwardly around the outside of the well packer C and upwardly into the lower end of the well packer. The reverse circulation of fluid will then force the plug E upwardly to the top of the well bore.

After the barrier or plug E has been retrieved from the tubular string B, subsequent operations can be performed through use of the apparatus which remains in the well bore. If a squeeze cementing operation is to be performed, then the packer apparatus C is set, usually with the lower expander 14 engaging the lower slips 15 to anchor the well packer against upward movement in the well casing, the packing structure 11 itself sealing off against the well casing D. The required quantity of fluid and cement slurry can now be pumped down through the tubular string B, such fluid moving through the fully opened bore 33 through the apparatus A and discharging from the lower end of the well packer C. In lieu of a cementing operation, a pressure acidizing operation, or formation fracturing can occur. For that matter, in view of the fact that there is a fully open bore 33 through the apparatus A, a perforating device can also be lowered through the tubular string B and completely through the apparatus A, C for performing a perforating operation below the well packer, this perforating device then being removable through the apparatus to the top of the well bore.

It is, accordingly, apparent that in a single trip into the well bore a formation test can be performed. If the formation test shows a need for other work in the well bore requiring the use of the packer apparatus, the passage through the apparatus A and the tubular string B can be fully opened by removing the barrier plug E, after which the necessary equipment or fluent material can be pumped downwardly through the apparatus and out of its lower portion.

After the subsequent operation has been performed, the well packer C can be released and the entire apparatus removed from the well casing D.

I claim:

1. In a tester valve adapted to be disposed in a well bore on a tubular spring: relatively rotatable inner and outer tubular members haivng a passage therethrough, one of said members being connectible to the tubular string; barrier means in at least a first of said members closing said passage and proportioned to be movable out of said first member; releasable holding means releasably engageable with said barrier means and retaining said barrier means in said first member; and means responsive to relative rotation between said tubular members for releasing said holding means from said barrier means, whereby said barrier means can move upwardly out of said first member and upwardly through the tubular string.

2. In a tester valve adapted to be disposed in a well bore on a tubular string: relatively movable inner and outer tubular members having a passage therethrough; one of said members being connectible to the tubular string; barrier means in at least a first of said members closing said passage and proportioned to be movable out of said first members; releasable latch means engageable with said barrier means; retaining means engaging said latch means to hold said latch means coupled to said barrier means to prevent movement of said barrier means from said passage; and means responsive to relative movement between said members for shifting said retaining means to a position permitting disengagement of said latch means from said barrier means, whereby said barrier means can move upwardly out of said first members and upwardly through the tubular string.

3. In a tester valve adapted to be disposed in a well bore on a tubular string: relatively movable inner and outer tubular members having a passage therethrough, one of said members being connectible to the tubular string; barrier means in at least a first of said members closing said passage and proportioned to be movable out of said first member; releasable latch means operatively associated with said barrier means; retaining means engaging said latch means to prevent its being shifted to released position to prevent movement of said barrier means from said passage; and means responsive to relative movement between said members for shifting said retaining means downwardly of said latch means to a position permitting release of said latch means, whereby said barrier means can move upwardly out of said first member and upwardly through the tubular string.

4. In a tester valve adapted to be disposed in a well bore on a tubular string: relatively rotatable inner and outer tubular members having a passage therethrough, one of said members being connectible to the tubular string; barrier means in at least a first of said members closing said passage and proportioned to be movable out of said first member; releasable holding means engageable with said barrier means retaining said barrier means in said one member; and means responsive to relative rotation between said tubular members for releasing said holding means, whereby said barrier means can move upwardly out of said first member and upwardly through the tubular string; said barrier means including a packing adapted to slidably seal along the wall of the tubular string.

5. In a tester valve adapted to be disposed in a well bore on a tubular string: relatively movable inner and outer tubular members having a passage therethrough, one of said members being connectible to the tubular string; barrier means in at least a first of said members closing said passage and proportioned to be movable out of said first member; releasable latch means engageable with said barrier means; retaining means engaging said latch means to hold said latch means engaged with said barrier means and prevent its being shifted to released position therefrom; and means responsive to relative movement between said members for shifting said retaining means to a position permitting release of said latch means from said barrier means, whereby said barrier means can move upwardly out of said first member and upwardly through the tubular string; said barrier means including a packing adapted to slidably seal along the wall of the tubular string.

6. In a tester valve adapted to be disposed in a well bore on a tubular string: upper and lower tubular members disposed one within the other, said upper member being connectible to the tubular string; barrier means in one of said members adapted to close the passage through said members and movable upwardly in said passage; releasable latch means adapted to be coupled to said barrier means; retaining means on one of said members engaging said latch means to hold said latch means coupled to said barrier means to prevent upward movement of said barrier means in said passage; and means providing a threaded connection between said retaining means and one of said members, whereby relative rotation between said retaining means and one member shifts said retaining means from holding relation to said latch means.

7. In a tester valve adapted to be disposed in a well bore on a tubular string: upper and lower tubular members disposed one within the other, said upper member being connectible to the tubular string; barrier means in one of said members adapted to close the passage through said members and movable upwardly in said passage; releasable latch means adapted to be coupled to said barrier means; retaining means on one of said members engaging said latch means to hold said latch means coupled to said barrier means to prevent upward movement of said barrier means in said passage; and means providing a threaded connection between said retaining means and one of said members, whereby relative rotation between said retaining means and one member shifts said retaining means from holding relation to said latch means; said barrier means including a packing adapted to slidably seal along the wall of the tubular string.

8. In a tester valve adapted to be disposed in a well bore on a tubular string: relatively rotatable upper and lower tubular members disposed one within the other, said upper member being connectible to the tubular string; barrier means in one of said members adapted to close the passage through said members and movable upwardly in said passage; releasable latch means adapted to be coupled to said barrier means; retaining means threadedly connected to said lower member and engaging said latch means to hold said latch means coupled to said barrier means to prevent upward movement of said barrier means in said passage; and means connecting said retaining means to said upper member, whereby rotation of said upper member rotates said retaining means on said lower member and releases said retaining means from said latch means and allows release of said latch means from said barrier means.

9. In a tester valve adapted to be disposed in a well bore on a tubular string: relatively rotatable upper and lower tubular members disposed one within the other, said upper member being connectible to the tubular string; barrier means in one of said members adapted to close the passage through said members and movable upwardly in said passage; releasable latch means adapted to be coupled to said barrier means; retaining means threadedly connected to said lower member and engaging said latch means to hold said latch means coupled to said barrier means to prevent upward movement of said barrier means in said passage; and means connecting said retaining means to said upper member, whereby rotation of said upper member rotates said retaining means on said lower member and releases said retaining means from said latch means and allows release of said latch means from said barrier means; said barrier means including a packing adapted to slidably seal along the wall of the tubular string.

10. In a tester valve adapted to be disposed in a well bore on a tubular string: relatively rotatable upper and lower tubular members disposed one within the other and rotatable with respect to one another, said upper member being connectible to the tubular string; barrier means in said upper member adapted to close the passage therethrough and movable upwardly in said passage; releasable latch means adapted to be coupled to said barrier means; a retaining sleeve threadedly connected to said lower member and engaging said latch means to hold said latch means coupled to said barrier means to prevent upward movement of said barrier means in said upper member; and means providing a splined connection between said retaining sleeve and upper member, whereby rotation of said upper member rotates said retaining sleeve on said lower member and releases said retaining sleeve from said latch means, allowing release of said latch means from said barrier means.

11. In a tester valve adapted to be disposed in a well bore on a tubular string: relatively movable upper and lower tubular members disposed one within the other, said upper member being connectible to the tubular string; barrier means in at least one of said members closing the passage through said members and movable upwardly in said passage; releasable latch means engageable with said barrier means and upper member; retaining means engaging said latch means to hold said latch means coupled to said barrier means to prevent upward movement of said barrier means relative to said upper member; and means responsive to relative movement between said members for shifting said retaining means to a position permitting disengagement of said latch means from said barrier means, whereby said barrier means can move upwardly through the tubular string.

12. In a tester valve adapted to be disposed in a well bore on a tubular string: relatively movable upper and lower tubular members disposed one within the other, said upper member being connectible to the tubular thing; barrier means in at least one of said members closing the passage through said members and movable upwardly in said passage; releasable latch means engageable with said barrier means and upper member; said barrier means and latch means having coengageable cam surfaces whereby said barrier means tends to shift said latch means laterally from engagement with said barrier means; retaining means engaging said latch means to prevent said barrier means from shifting said latch means laterally, whereby said latch means is held coupled to said barrier means to prevent upward movement of said barrier means relative to said upper member; and means responsive to relative movement between said members for shifting said retaining means to a position permitting said barrier means to shift said latch means laterally and disengage said latch means from said barrier means, whereby said barrier means can move upwardly through the tubular string.

13. In a tester valve adapted to be disposed in a well bore on a tubular string: relatively movable upper and lower tubular members disposed one within the other, said upper member being connectible to the tubular string; barrier means in at least one of said members closing the passage through said members and movable upwardly in said passage; a latch sleeve having latch fingers engageable with said barrier means and upper member; said barrier means and fingers having coengageable cam surfaces whereby said barrier means tends to shift said fingers laterally outwardly from engagement with said barrier means; a retaining sleeve threadedly connected to said lower member and encompassing and engaging said latch fingers to prevent said barrier means from shifting said fingers laterally outwardly, whereby said fingers are held coupled to said barrier means to prevent upward movement of said barrier means relative to said upper member; and means providing a splined connection between said retaining sleeve and upper member, whereby rotation of said upper member rotates said retaining sleeve on said lower member and releases said retaining sleeve from said fingers, allowing release of said fingers from said barrier means.

References Cited in the file of this patent

UNITED STATES PATENTS

| | | |
|---|---|---|
| 1,968,282 | Cavins | July 31, 1934 |
| 1,996,922 | Howard | Apr. 9, 1935 |
| 2,394,977 | Boynton | Feb. 19, 1946 |
| 2,726,848 | Montgomery et al. | Dec. 13, 1955 |
| 2,737,244 | Baker et al. | Mar. 6, 1956 |
| 2,742,093 | Vaughn | Apr. 17, 1956 |
| 2,778,433 | Brown | Jan. 22, 1957 |
| 2,802,534 | Conrad | Aug. 13, 1957 |
| 2,806,539 | Green et al. | Sept. 17, 1957 |
| 2,955,458 | Sonnier et al. | Oct. 11, 1960 |